United States Patent [19]

Hall

[11] Patent Number: 5,383,462

[45] Date of Patent: Jan. 24, 1995

[54] WIDEBAND TIME-DOMAIN CROSS-CORRELATION METHOD USING BASEBAND DATA

[75] Inventor: Anne L. Hall, New Berlin, Wis.

[73] Assignee: General Electric Company, Milwaukee, Wis.

[21] Appl. No.: 157,807

[22] Filed: Nov. 24, 1993

[51] Int. Cl.$^6$ ............................................. A61B 8/00
[52] U.S. Cl. ......................... 128/661.08; 128/661.09
[58] Field of Search ................... 128/661.08, 661.09, 128/661.10, 662.01; 73/861.25, 861.06, 602

[56] References Cited

U.S. PATENT DOCUMENTS

| | | | |
|---|---|---|---|
| 5,188,114 | 2/1993 | Thiele et al. | 128/661.09 |
| 5,190,044 | 3/1993 | Kawasaki et al. | 128/661.08 |

OTHER PUBLICATIONS

Bonnefous, O. et al., "Time Domain Formulation of Pulse–Doppler Ultrasound and Blood Velocity Estimation by Cross Correlation", Ultrasonic Imaging 8, pp. 73–85 (1986).

Ferrara, Katherine W., "A New Wideband Spread Target Maximum Likelihood Estimator for Blood Velocity Estimation–Part I: Theory", IEEE Transactions on Ultrasonics, Ferroelectrics, and Frequency Control, vol. 38, No. 1, Jan., 1991, pp. 1–16.

Ferrara, Katherine W., "A New Wideband Spread Target Maximum Likelihood Estimator for Blood Velocity Estimation–Part II: Evaluation of Estimators with Experimental Data", IEEE Transactions on Ultrasonics, Ferroelectrics, and Frequency Control, vol. 38, No. 1, Jan. 1991, pp. 17–26.

Foster, Steven G. et al., "Flow Velocity Profile via Time–Domain Correlation: Error Analysis and Computer Simulation", IEEE Transactions on Ultrasonics, Ferroelectrics and Frequency Control, vol. 17, No. 2, May 1990, pp. 164–174.

Kasai, Chihiro et al., "Real-Time Two–Dimensional Blood Flow imaging Using an Autocorrelation Technique", IEEE Transactions on Sonics and Ultrasonics, vol. SU–32, No. 3, May 1985, pp. 458–464.

Primary Examiner—George Manuel
Attorney, Agent, or Firm—Dennis M. Flaherty; John H. Pilarski

[57] ABSTRACT

A method for estimating the velocity of flow containing a cloud of ultrasound scatterers using time-domain cross-correlation of baseband data. When the scatterers move from one range cell to another between firings, the returning echo signals from adjacent firings will look like time-shifted copies of each other. When the data is basebanded, however, the signals no longer look like time-shifted copies of each other because the baseband process divides the incoming signal into complex quadrature signals. The relative amounts in the real and imaginary parts will be dependent on the relative phase of the incoming signal and the complex mixer, and is therefore range dependent. A scattered signal that may be all real in one firing will have both I and Q components in the next firing when the scatterer has moved by several range cells. This is compensated for by rotating the baseband data for the second firing, prior to cross-correlation, by an angle equivalent to $2\pi$ times the mixer frequency (of the quadrature demodulator) divided by the sample rate. The correlation lag corresponding to the actual scatterer displacement will be concentrated in the real part of the complex correlation function, and this can be identified using both peak and phase information.

20 Claims, 4 Drawing Sheets

WIDEBAND TIME-DOMAIN CROSS-CORRELATION METHOD USING BASEBAND DATA

FIELD OF THE INVENTION

This invention generally relates to ultrasound color flow Doppler imaging of fluid flow fields. In particular, the invention relates to a method and an apparatus for imaging blood flowing in the human body by detecting Doppler shifting of ultrasonic echoes reflected from the flowing blood.

Background of the Invention

Measurement of blood flow in the heart and vessels using the Doppler effect is well known. Whereas the amplitude of the reflected waves is employed to produce black and white images of the tissues, the frequency or time shift of the reflected waves may be used to estimate the velocity of reflecting scatterers from tissue or blood. Color flow images are produced by superimposing a color image of the velocity of moving material, such as blood, over the black and white anatomical image. The measured velocity of flow at each pixel determines its color.

Pulsed Doppler techniques, used to estimate flow velocity, provide blood flow information at a specified depth on the ultrasound beam axis. Pulsed Doppler devices usually provide the time variation of the blood velocity within a single range cell, i.e., at a specified depth, in the form of an ultrasound echo signal which has undergone a Doppler frequency shift.

A pulsed Doppler system which produces a two-dimensional flow mapping in real time using autocorrelation was disclosed by Kasai et al. in an article in IEEE Trans. Sonics & Ultrasonics, Vol. SU-32, No. 3, May 1985, pp. 458–464, entitled "Real-Time Two-Dimensional Blood Flow Imaging Using Autocorrelation Technique". In this system, the phase shift of successive echoes from the moving scatterers, in response to the emission of a recurrent train of excitation pulses, is detected. This type of pulsed Doppler instrument does not measure the classical Doppler frequency shift of a single echo, but rather the phase differences of the successive echoes from moving targets are detected to extract the Doppler frequency shift.

A system which measures time shifts proportional to the local blood velocity using an rf time-domain cross-correlation technique is disclosed by Bonnefous et al. in "Time-Domain Formulation of Pulse-Doppler Ultrasound and Blood Velocity Estimation by Cross-Correlation" Ultrasonic Imaging, 8, 73–85 (1986) and by Foster et al. in "Flow Velocity Profile via Time-Domain Correlation: Error Analysis and Computer Simulation" IEEE Trans Ultrasonics, Ferroelectrics, Frequency Control, Vol. 37, No. 2, May 1990, pp. 164–175. In accordance with this technique, the velocity estimate is made by finding the peak of the cross-correlation function between adjacent firings. The displacement of the correlation function peak indicates the movement of scatterers, and this displacement divided by the time between firings directly gives the velocity of the scatterers. This "scatterer tracking" method has several advantages over the conventional spectral analysis methods using fast Fourier transforms, autocorrelation, or any of the autoregressive, moving-average or autoregressive moving-average models (such as the maximum entropy method).

In the first place, spectral methods, such as the technique of Kasai, measure the Doppler frequency shift and therefore have better velocity resolution if narrowband signals are transmitted. Narrowband signals, however, are longer in time so that spatial resolution is degraded. If one uses shorter pulses (wider band signals) to improve spatial resolution, one finds decreased velocity resolution coming both from the spread of resulting Doppler shifts (which are dependent on the original spread of transmit frequencies) and from decorrelation caused by scatterers moving into and out of the smaller range cell during the measurement process. Most Doppler-based estimators typically choose to trade off spatial resolution for increased velocity resolution. The time-domain cross-correlation, on the other hand, provides a method that makes use of the shorter wideband pulses to optimize both spatial resolution and velocity resolution simultaneously, since the accurate tracking of flow signals particular for low-velocity flow relies on good spatial resolution.

Secondly, spectral estimators are notorious for the aliasing that occurs at high velocities, while the time-domain cross-correlation method, at least in theory, should be immune to this. However, the time-domain cross-correlation method requires digitized rf data at a high sampling rate, making it an impractical method for implementation on a system that supplies digitized baseband quadrature data to a color flow processor at a low sampling rate.

A subsequent cross-correlation method using baseband data was proposed by Ferrara and Algazi in "A New Wideband Spread Target Maximum Likelihood Estimator for Blood Velocity Estimation" IEEE Trans Ultrasonics, Ferroelectrics, & Frequency Control, Vol. 38, No. 1, January 1991, pp. 1–16 (Part I) and pp. 17–26 (Part II). Ferrara and Algazi describe a class of theoretical wideband estimators, which basically involve modeling complex baseband signals for a range of proposed scatterer velocities and using these as matched filters against subsequent collected firings. A complex correlation is calculated and the peak of the complex correlation identifies the optimum matched filter. The matched filter accounts for scatterer displacement over time, so these are wideband "tracking" algorithms in the same vein as the rf time-domain cross-correlation method. Besides being wideband estimators, these methods also have the advantage that various propagation effects, such as frequency-dependent attenuation, can be included in the modeling of the filter.

In their evaluation studies, Ferrara and Algazi use the simplest matched filter, i.e., the signal from another firing, and call this the wideband point maximum likelihood estimator. This is equivalent to the rf time-domain cross-correlation method discussed above, with the exception that in the baseband case, a complex correlation is performed and the peak magnitude of the complex correlation function is used to determine scatterer displacement. This technique is less robust than the rf case because the baseband data is varying much more slowly, so the correlation peaks are harder to pinpoint, and phase information is thrown away by using the complex magnitude, so erroneous estimates may occur in places where envelope correlation is high but the original quadrature signals are completely out of phase.

SUMMARY OF THE INVENTION

The present invention is a method that allows time-domain cross-correlation using baseband data. It is an extension of the matched filter concept of Ferrara and Algazi, and attempts to regain the advantages of the rf time-domain cross-correlation technique while still using baseband data. In accordance with the rf time-domain cross-correlation technique, if a point scatterer moves from one range cell to another between firings, the returning rf waveforms from those firings will look like time-shifted copies of each other (which is what allows the rf time-domain method to work).

When the data is basebanded, however, the signals no longer look like time-shifted copies of each other because the baseband process divides the incoming signal into complex quadrature signals. The relative amounts in the real and imaginary parts will be dependent on the relative phase of the incoming signal and the complex mixer signal, and is therefore range dependent. A scattered signal that may be all real in one firing will have both I and Q components in the next firing when the scatterer has moved by several range cells.

The concept of the present invention accounts for this effect using the known mixer frequency of the quadrature demodulator used to baseband the data. If a scatterer moves exactly one range cell, the complex phasor of its demodulated echo signal will be rotated by an angle equivalent to $2\pi$ times the mixer frequency divided by the sample rate. Therefore, when calculating the correlation function at a lag of unity, the data for firing 2 can be rotated back correctly relative to firing 1. The correlation lag corresponding to the actual scatterer displacement will not only have a high value but will be concentrated in the real part of the complex correlation function. Using this additional information retains the phase information that is discarded by the method of Ferrara and Algazi and makes the velocity estimator more robust.

Computer modeling studies indicated this method has a performance that closely resembles the rf time-domain cross-correlation method. The invention provides a way of obtaining the potential benefits from wideband imaging and supposed aliasing immunity while still using a front end beamformer which supplies digitized baseband quadrature data at a low sampling rate.

DETAILED DESCRIPTION OF THE PREFERRED EMBODIMENTS

Figure 1:
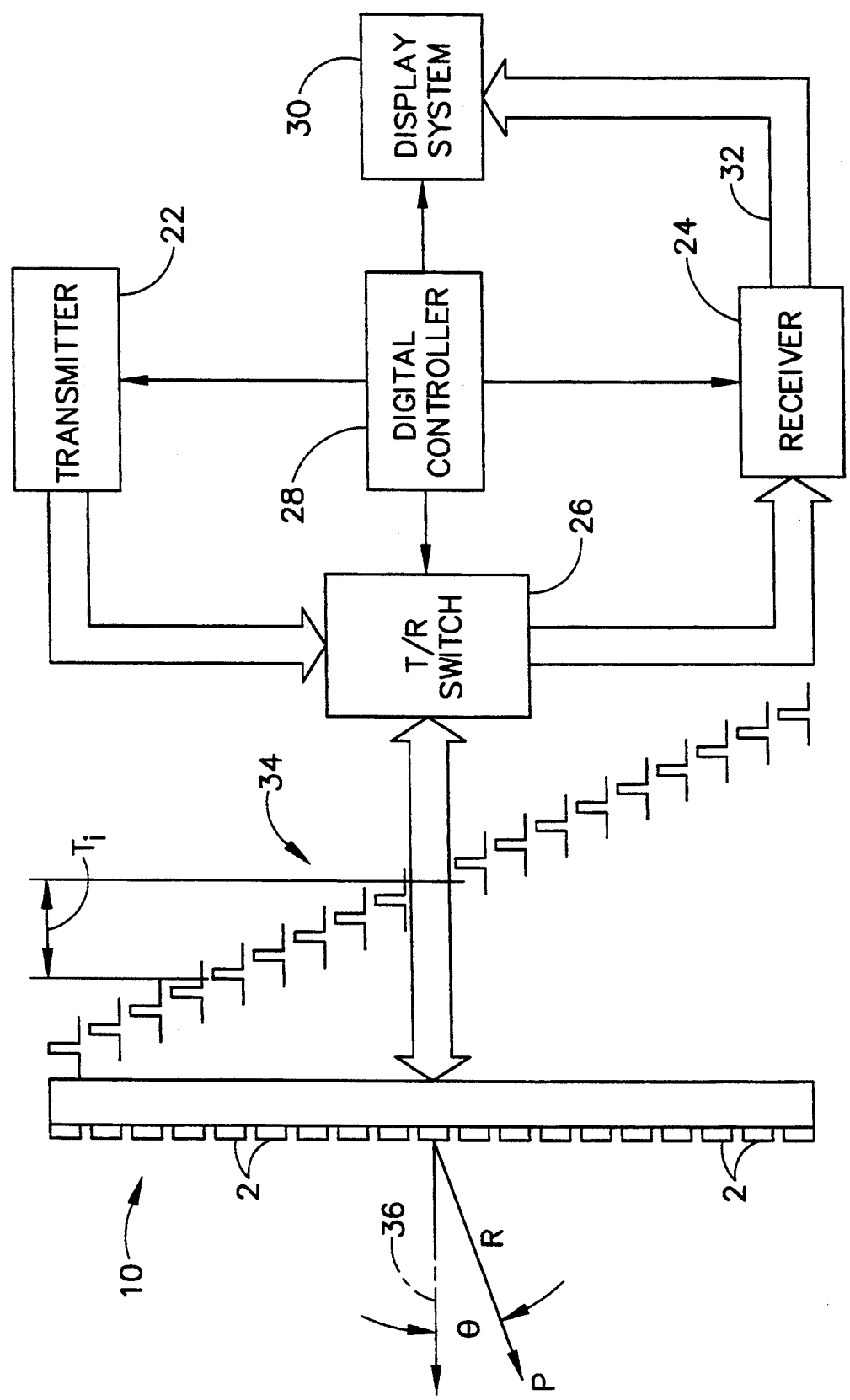
FIG. 1 is a block diagram of an ultrasonic imaging system which incorporates the present invention.

Referring to FIG. 1, the ultrasonic imaging system incorporating the invention includes a transducer array 10 comprised of a plurality of separately driven transducers 2, each of which produces a burst of ultrasonic energy when energized by a pulsed waveform produced by a transmitter 22. The ultrasonic energy reflected back to transducer array 10 from the object under study is converted to an electrical signal by each receiving transducer 2 and applied separately to a receiver 24 through a set of transmit/receive (T/R) switches 26. Transmitter 22, receiver 24 and switches 26 are operated under control of a digital controller 28 responsive to commands by a human operator. A complete scan is performed by acquiring a series of echoes in which switches 26 are set to their transmit position, transmitter 22 is gated ON momentarily to energize each transducer 2, switches 26 are then set to their receive position, and the subsequent echo signals produced by each transducer 2 are applied to receiver 24. The separate echo signals from each transducer 2 are combined in receiver 24 to produce a single echo signal which is used to produce a line in an image on a display system 30.

Transmitter 22 drives transducer array 10 such that the ultrasonic energy produced is directed, or steered, in a beam. To accomplish this, transmitter 22 imparts a time delay $T_i$ to the respective pulsed waveforms 34 that are applied to successive transducers 2. By adjusting the time delays $T_i$ appropriately in a conventional manner, the ultrasonic beam can be directed away from axis 36 by an angle $\theta$. A sector scan is performed by progressively changing the time delays $T_i$ in successive excitations. The angle $\theta$ is thus changed in increments to steer the transmitted beam in a succession of directions.

The echo signals produced by each burst of ultrasonic energy reflect from objects located at successive ranges along the ultrasonic beam. The echo signals are sensed separately by each transducer 2 and a sample of the magnitude of the echo signal at a particular point in time represents the amount of reflection occurring at a specific depth (i.e., range gate). Due to the differences in the propagation paths between a reflecting point P and each transducer 2, however, these echo signals will not be detected simultaneously and their amplitudes will not be equal. Receiver 24 amplifies the separate echo signals, imparts the proper time delay to each, and sums them to provide a single echo signal which accurately indicates the total ultrasonic energy reflected from point P located at range R along the ultrasonic beam oriented at the angle $\theta$. Demodulation can occur either before or after the individual received signals are summed together.

Figure 2:
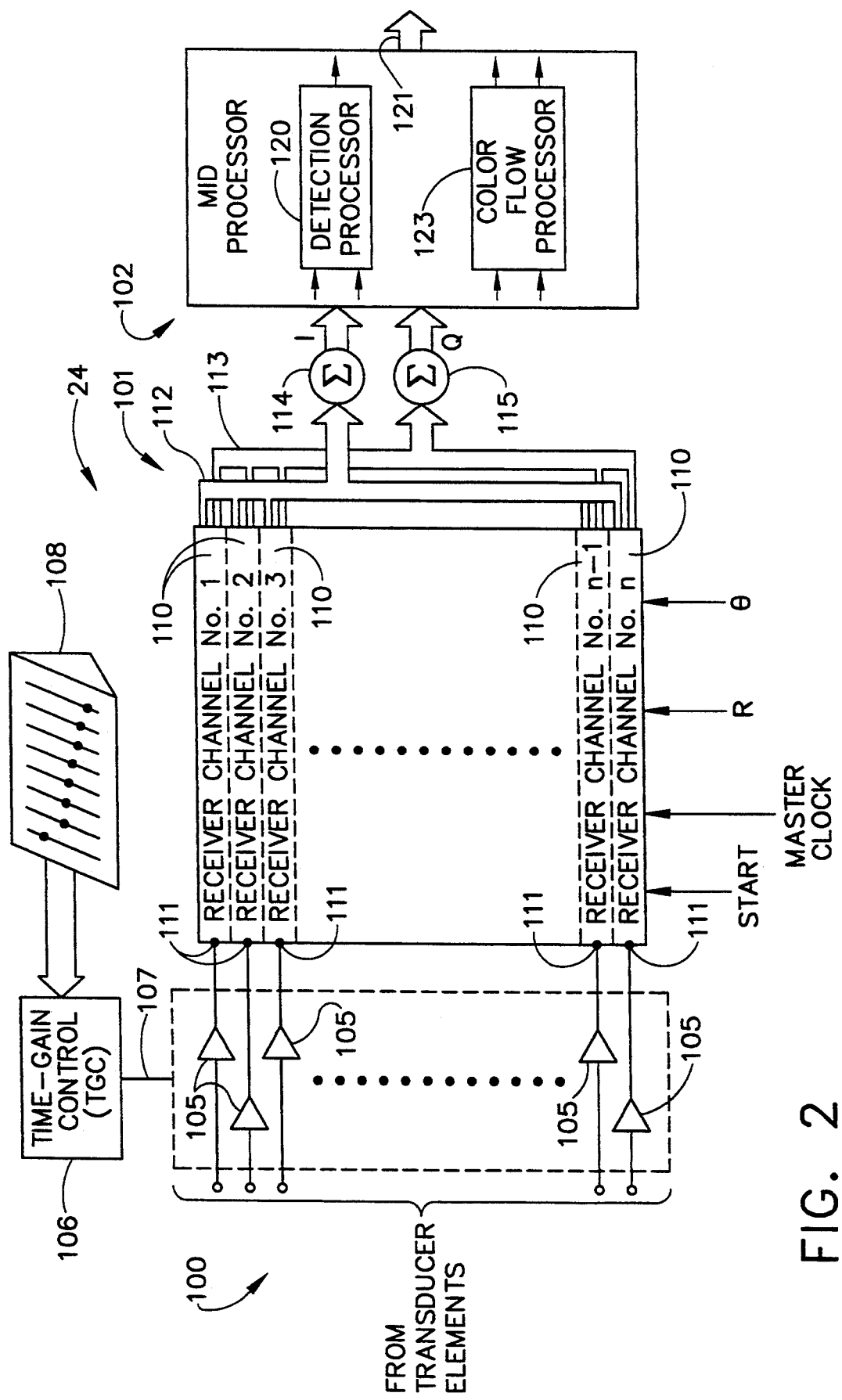
FIG. 2 is a block diagram of a receiver which forms part of the system of FIG. 1.

To simultaneously sum the electrical signals produced by the echoes impinging on each transducer 2, time delays are introduced into each separate transducer channel 110 of receiver 24 (see FIG. 2). The beam time delays for reception are the same delays ($T_i$) as the transmission delays described above. However, the time delay of each receiver channel is continuously changing during reception of the echo to provide dynamic focusing of the received beam at the range R from which the echo signal emanates.

Under direction of digital controller 28, receiver 24 provides delays during the scan such that steering of receiver 24 tracks the direction $\theta$ of the beam steered by transmitter 22 and samples the echo signals at a succession of ranges R and provides the proper delays and phase shifts to dynamically focus at points P along the beam. Thus, each emission of an ultrasonic pulse waveform results in the acquisition of a series of data points which represent the amount of reflected sound from a corresponding series of points P located along the ultrasonic beam.

Display system 30 receives the series of data points produced by receiver 24 and converts the data into the desired image.

Referring to FIG. 2, receiver 24 comprises three sections: a time-gain control section 100, a receive beamforming section 101 and a mid-processor 102. Time-gain control (TGC) section 100 includes a respective amplifier 105 for each of the receiver channels 110 and a time-gain control circuit 106. The input of each amplifier 105 is connected to a respective one of transducers 2 to amplify the echo signal which it receives. The amount of amplification provided by amplifiers 105 is controlled through a control line 107 that is driven by TGC circuit 106, the latter being set by hand operation of potentiometers 108.

The receive beamforming section 101 of receiver 24 includes separate receiver channels 110. Each receiver channel 110 receives the analog echo signal from one of amplifiers 105 at an input 111. Each amplified signals is conveyed to a pair of quadrature detectors in the respective receiver channel, where the phases of the mixing reference frequency differ by 90°. Since this reference frequency is made identical to that of the transmitted pulses, the outputs from low-pass filter in the receiver channel become the complex Doppler frequencies that have been shifted by Doppler effects, and the pair of outputs also become complex signals (I and Q) with phases that differ by 90°. These signals are output as a stream of digitized output values on an I bus 112 and a Q bus 113. Each of these I and Q baseband signals represents a demodulated sample of the echo signal envelope at a specific range R. These samples have been delayed such that when they are summed at summing points 114 and 115 with the I and Q samples from each of the other receiver channels 110, the summed signals indicate the magnitude and phase of the echo signal reflected from a point P located at range R on the steered beam ($\theta$).

Midprocessor section 102 receives the beam samples from summing points 114 and 115. The I and Q values of each beam sample are signals representing the in-phase and quadrature components of the magnitude of the reflected sound from a point (R, $\theta$). A color flow processor 123 receives the I and Q values of each demodulated and focussed echo signal sample from summing points 114 and 115, and produces a flow value at the midprocessor output 121. This flow signal controls the red, green and blue display colors, and is applied to display system 30 (see FIG. 1) along with the magnitude M for the same point. The color indicated by this flow value is a function of the velocity and direction of flow, and the flow power, as measured by color flow processor 123.

Figure 3:
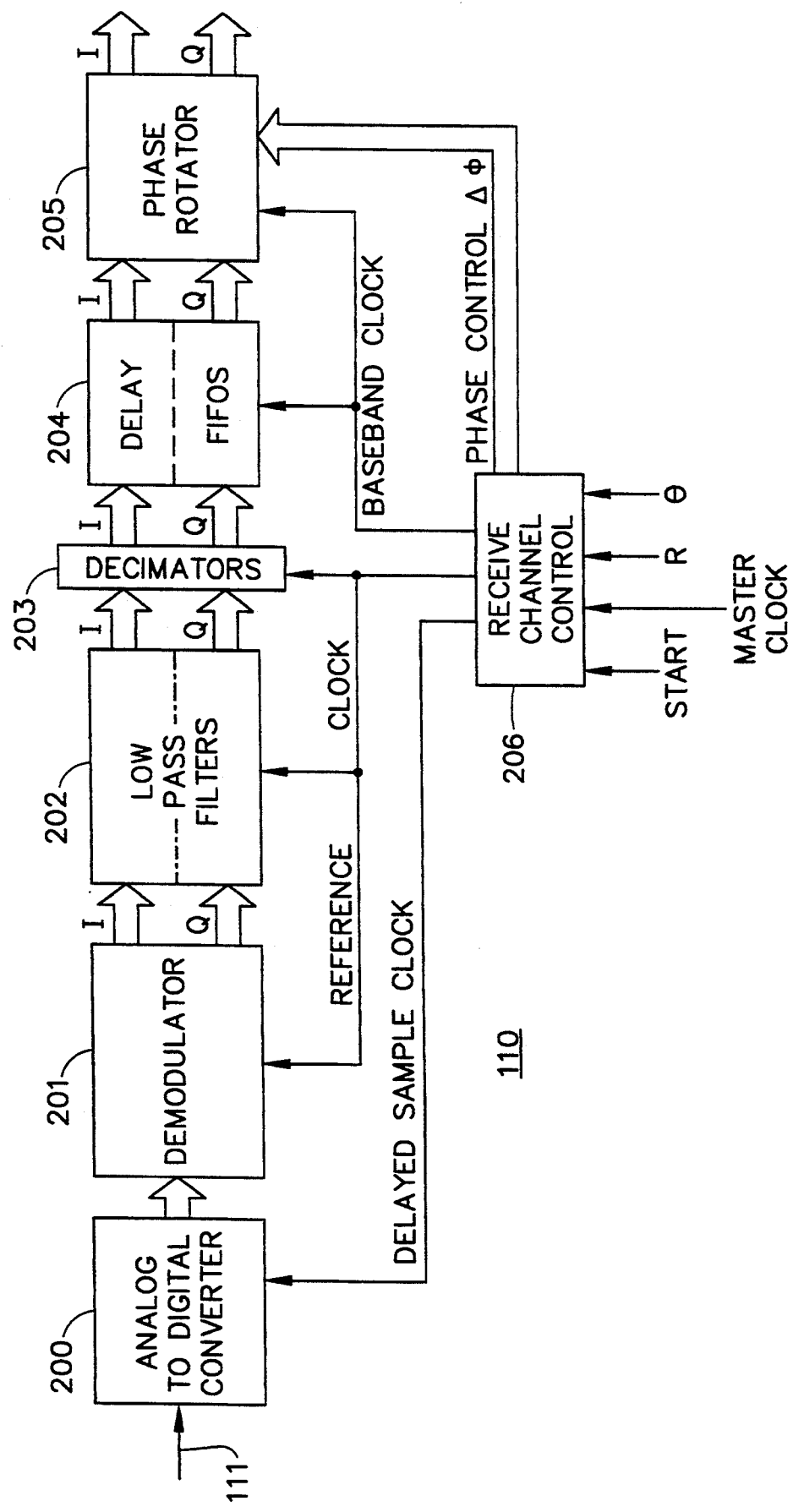
FIG. 3 is a block diagram of a receiver channel which forms part of the receiver of FIG. 2.

Referring to FIG. 3, each receiver channel is responsive to a START command, a master clock, and a beam angle signal ($\theta$) from digital controller 28 (FIG. 1) to perform the digital beamforming functions, which include: sampling the analog input signal 111 in an analog-to-digital converter (ADC) 200; demodulating the sampled signal in a demodulator 201; filtering out the high-frequency sum signals produced by demodulator 201 with low pass filters 202; reducing the data rate in decimators 203; and time delaying and, if necessary, phase adjusting the resulting digital data stream in delay FIFOs (i.e., first-in/first-out memories) 204 and phase rotator 205. Elements 200-205 are controlled by a receive channel control 206 which produces the required clock and control signals in response to commands from digital controller 28 (FIG. 1).

The ADC 200 samples the analog signal at regular intervals. These samples are provided to demodulator 201, which mixes each sample with both a reference that is in-phase with the transmitted ultrasonic carrier, and with a reference in quadrature with the transmitted ultrasonic carrier. This complex mixer has a predetermined frequency $f_{mix}$. The low pass filters 202 are finite impulse response (FIR) filters tuned to pass the difference frequencies, but block the higher sum frequencies supplied by demodulator 201. The output signal of each low pass filter is a stream of digital values which indicate the magnitude of the I or Q component of the echo signal envelope.

The rate at which the demodulated I and Q components of the echo signal are sampled is reduced by decimators 203. The echo signal envelope represented by the demodulated and decimated digital samples is then delayed by delay FIFOs 204 and possibly phase shifted by phase rotator 205 to provide the desired beam steering and beam focusing.

The color flow midprocessor 123 provides a realtime two-dimensional image of blood velocity in the imaging plane. In accordance with the present invention, color flow midprocessor 123 estimates blood velocity by determining the location of the maximum of the real component of the complex correlation function between the baseband data of a first firing and the baseband data of a second firing. The lag associated with the real peak and phase minimum represents the number of range cells traversed by the blood flow between firings 1 and 2. Thus flow velocity can be estimated from the lag and time between firings.

To perform time-domain cross-correlation, at least two ultrasound pulses must be transmitted along the same trajectory. The respective echoes from these firings are used to measure the axial component of the velocity vector of point scatterers moving inside a vessel. At time $t=t_0$ a point scatterer is located at position $X_1$ and at time $t=t_0+T$ that scatterer has moved to a new position $X_2$. The return echo from the scatterer will then appear either earlier or later in the second firing than in the first firing. Thus, the speed of the scatterer is $(X_2-X_1)/T$, where T is the time difference between the transmission of the two pulses.

As each transmitted ultrasound pulse propagates through the flowing blood, any scatterers in the path of the pulse will scatter the ultrasound to produce an echo signal which varies over time. To determine the time shift between the respective echoes for the two firings at a particular range for multiple scatterers, a plurality of range-gated sections from each of the first and second firings are acquired. These range-gated sections, which may overlap, correspond to a plurality of equally spaced range cells at corresponding specified ranges along the path of propagation. The waveforms for these range-gated sections are quadrature demodulated, lowpass filtered and decimated. As in normal color flow processing, a wall filter is first applied. The baseband data produced by the first firing for a first set of the range cells is then cross-correlated with the baseband data produced by the second firing for a plurality of sets of range cells, each of these range cell sets being shifted incrementally, i.e., lagging, relative to the previous range cell set. Peak and phase detection are then used to determine the lag corresponding to maximum correlation since the true time shift should occur at the location where the real part of the cross-correlation function is maximum and the phase is zero. The time shift corresponding to this lag can then be used to estimate the flow velocity at the desired range.

Figure 4:
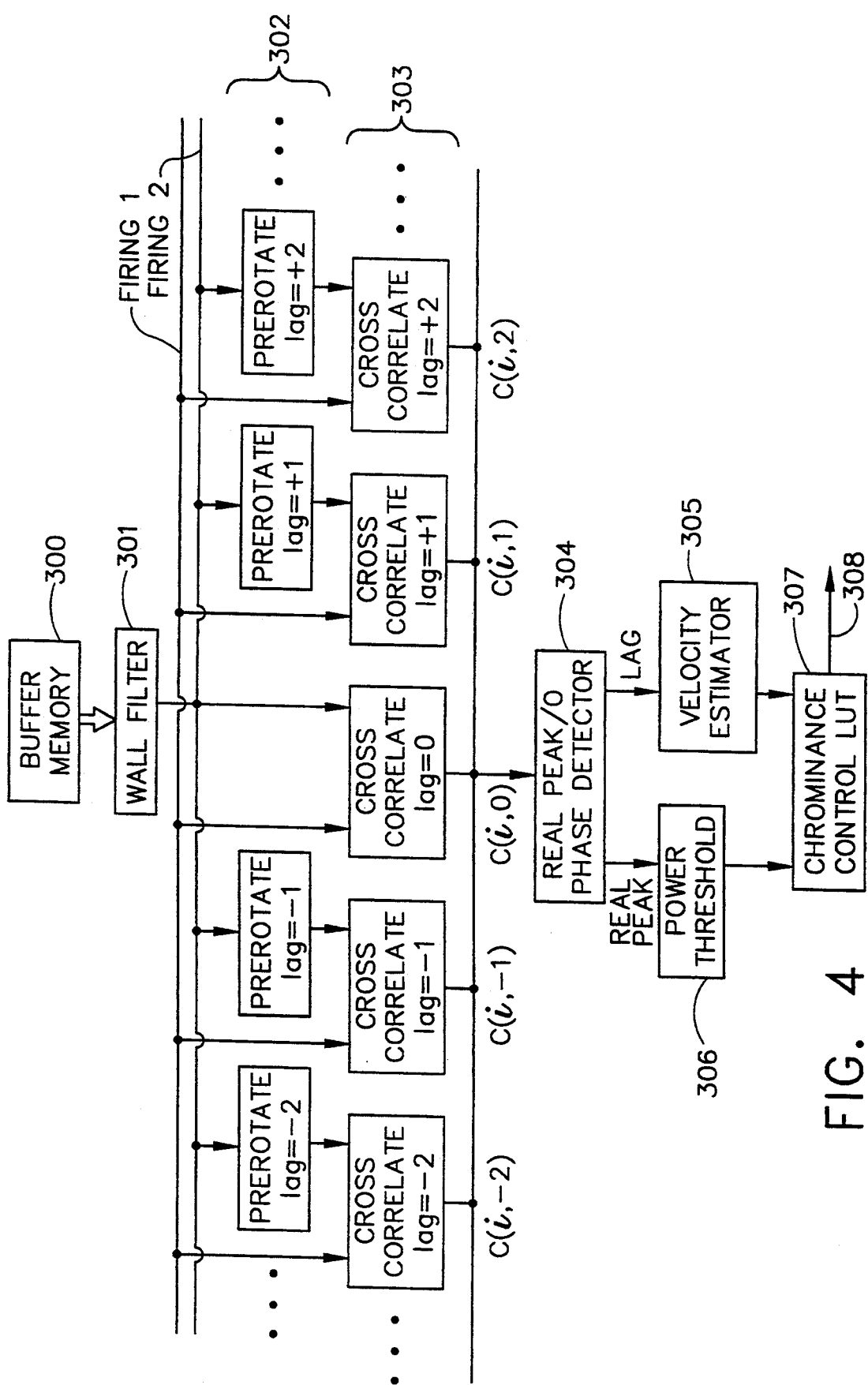
FIG. 4 is a block diagram of a portion of a color flow processor in accordance with the present invention, which forms part of the receiver of FIG. 2.

A possible circuit for performing the foregoing estimation is generally depicted in FIG. 4. The sampled baseband I, Q data for all firings is stored in buffer memory 300. Buffer memory 300 is controlled to output the baseband I, Q data for those range-gated sections of firings 1 and 2 which are to be correlated, the range-gated sections for firing 1 being controlled by the cross-correlation integration time and the range-gated sections of interest for firing 2 being determined by the lag plus the integration time. Each lag term in the cross-correlation function will use the same range-gated section from firing 1, but different range-gated sections from firing 2. This baseband data is then filtered by wall filter 301 in conventional manner.

When the data is basebanded, the signals do not look like time-shifted copies of each other because the baseband process divides the incoming signal into complex quadrature signals. The relative amounts in the real and imaginary parts will be dependent on the relative phase of the incoming signal and the complex mixer, and is therefore range dependent. A scattered signal that may be all real in one firing will have both I and Q components in the next firing when the scatterer has moved by several range cells.

The concept of the present invention accounts for this effect using the known frequency $f_{mix}$. If a scattering point moves exactly one range cell (i.e., lag=1), its signal will be rotated by an angle equivalent to $2\pi$ times the mixer frequency $f_{mixer}$ divided by the sample rate SR. In particular, the new I', Q' data is phase rotated by pre-rotator 302, which is controlled to rotate only the I', Q' data for firing 2 (i e , the I', Q' data for firing 1 by-passes pre-rotator 302). The angle of rotation in accordance with the invention equals $(2\pi f_{mix} \times \text{lag})/\text{SR}$, where $f_{mix}$ is the mixer frequency used in the quadrature demodulation, SR is the predetermined sample rate, and lag is the number of range cells by which the range cell set for the second firing is shifted relative to the range cell set for the first firing. SR need not be equal to the range cell sample rate, and in fact one can get finer lag resolution than the coarse sample rate if one desires.

The cross-correlation function for the baseband data for the first and second firings is computed in cross-correlator 303 by summing the products of the complex quadrature waveforms for respective range-gated sections. Each range-gated section corresponds to a respective range cell lying along the ultrasound axis at a corresponding depth, with the range-gated sections for the second firing lagging the range-gated sections for the first firing by a predetermined number of range cells designated "lag". For example, range cells 1–10 for firing 1 are correlated with range cells 2–11 of firing 2 to form a first correlation (lag=1); then range cells 1–10 for firing 1 are correlated with range cells 3–12 of firing 2 to form a second correlation (lag=2); and so forth until correlations are determined for a range of lags (e.g., 1 to 20).

The maximum correlation corresponds to the peak in the real part of the complex correlation function with the minimum absolute phase, which are detected by the peak/phase detector 304. Using the phase increases the sensitivity since the correlation peak may be broad from the basebanding process. Detector 304 outputs the lag value corresponding to the maximum correlation to a velocity estimator 305 and outputs the amplitude of the real term at the correlation maximum to the power threshold 306. The lag indicates the distance which the scatterers have traveled during the interfiring period. The velocity estimator computes the blood velocity in the range cell of interest using the lag and the interfiring period. The estimated velocity is applied to address inputs of a chrominance control look-up table (LUT) 308 which resides in the display system 30 (FIG. 1). Each addressable memory in the chrominance control LUT stores bits of data which are read out on bus 308. These bits control the colors to be displayed on the flow velocity image. These bit patterns are read out from LUT 307 such that as the flow velocity changes in direction or magnitude, the color of the pixel at the corresponding location (R, $\theta$) is changed. For example, flow toward the transducer may be indicated as red and flow away from the transducer may be indicated as blue. The faster the flow, the brighter the color. If the real peak falls below the power threshold, no color is displayed.

Thus, in accordance with the method of the present invention, when calculating the correlation function at a predetermined lag, the data for firing 2 can be rotated back correctly relative to firing 1 as a function of that predetermined lag. The correlation corresponding to the actual scatterer displacement will not only have a high value but will be concentrated in the real part of the complex correlation function. Retaining the phase information in the complex-correlation function allows one to use this aspect.

Looking at it in another way, each point in the correlation function measures the probability that a scatterer has moved by the equivalent displacement between two firings. If one is calculating the correlation function at lag=2, and rotates the data in the second firing as if it had moved by two range cells between firings, the data in the two firings should then look like time-shifted copies of each other if the scatterer really had moved by two range cells (and a high completely real correlation will be produced), but will not look like copies if the scatterer really moved somewhere else.

The mathematics involved is straightforward. If no correction is done, the complex correlation function is calculated as follows:

$$C(i, \text{lag}) = \sum_t S_i(t_0 + t) S^*_{i+1}(t_0 + t + \text{lag})$$

where $t_0$ is the range cell of interest, t is the integration range, and $S_i$ is the complex quadrature waveform for firing i:

$$S_i(t) = I_i(t) + iQ_i(t)$$

For the proposed method of the present invention, the data for the second firing must be pre-rotated to correct for the mixer phase at the different lags in accordance with the following equations:

$$C(i, \text{lag}) = \sum_t S_i(t_0 + t) S'^*_{i+1}(t_0 + t + \text{lag})$$

$$S'_i(t + \text{lag}) = (I_i(t + \text{lag}) +$$

$$iQ_i(t + \text{lag})) \left( \cos \frac{2\pi f_{mix} \text{lag}}{SR} - i\sin \frac{2\pi f_{mix} \text{lag}}{SR} \right)$$

One then finds the lag that corresponds to the peak in the real part only of the complex correlation function (or equivalently finds the lag corresponding to the point in the correlation function with the minimum absolute phase). This then is the scatterer displacement, and when divided by the interfiring time, will give the scatterer velocity.

The foregoing preferred embodiment has been disclosed for the purpose of illustration. Variations and modifications will be readily apparent to those skilled in the art of ultrasonic flow velocity estimation. All such variations and modifications are intended to be encompassed by the claims set forth hereinafter.

I claim:

1. A method for estimating the velocity of flow containing a cloud of ultrasound scatterers, comprising the steps of:
    firing a first ultrasound beam at a first instant of time, said first ultrasound beam being directed along a path of propagation through said flow;
    detecting the ultrasound reflected by said scatterers to form first through n-th echo signals of said first firing, said first through n-th echo signals being respectively the result of scattering in first through n-th range cells at first through n-th ranges along said path of propagation, where n is a positive integer greater than unity;
    quadrature demodulating said first through n-th echo signals of said first firing to form a first set of baseband data;
    sampling said first set of baseband data at a predetermined sample rate;
    firing a second ultrasound beam along said path of propagation at a second instant in time, the period of time between said first and second instants of time constituting an interfiring period;
    detecting the ultrasound reflected by said scatterers to form first through n-th echo signals of said second firing, said first through n-th echo signals being respectively the result of scattering in said first through n-th range cells;
    quadrature demodulating said first through n-th echo signals of said second firing to form a second set of baseband data;
    sampling said second set of baseband data at said predetermined sample rate;
    selecting sampled baseband data from said first set which corresponds to a first group of adjacent range cells and from said second set which corresponds to a second group of adjacent range cells, said second group being displaced relative to said first group by a lag selected from a predetermined series of lags;
    pre-rotating said sampled baseband data selected from said second set to be in phase in the complex plane with said sampled baseband data selected from said first set;
    computing the complex correlation function correlating said sampled baseband data selected from said first set with said sampled baseband data selected from said second set for each lag in said predetermined series of lags;
    determining which one of said predetermined series of lags corresponds to the maximum correlation between the real parts of said complex correlation function with minimum absolute phase; and
    computing an estimated flow velocity as a function of said determined lag value and said interfiring period.

2. The method as defined in claim 1, wherein said baseband data of said second firing is rotated by a phase angle proportional to the lag.

3. The method as defined in claim 1, wherein said baseband data of said second firing is rotated by a phase angle which is a function of the lag.

4. The method as defined in claim 3, wherein said baseband data of said second firing is rotated by a phase angle equivalent to $(2\pi f_{mix} - \text{lag})/SR$, where lag is the lag value and $f_{mix}$ is the mixer frequency used in said quadrature demodulating steps and SR is said predetermined sample rate.

5. The method as defined in claim 1, wherein said complex correlation function is:

$$C(i, \text{lag}) = \sum_t S_i(t_0 + t) S^*_{i+1}(t_0 + t + \text{lag})$$

where lag is the lag value and $S_i$ represents said pre-rotated baseband data of said first firing and $S'_i$ represents said pre-rotated baseband data of said second firing.

6. The method as defined in claim 5, wherein:

$$S'_i(t + \text{lag}) = (I_i(t + \text{lag}) + iQ_i(t + \text{lag})) \left( \cos \frac{2\pi f_{mix} \text{lag}}{SR} - i \sin \frac{2\pi f_{mix} \text{lag}}{SR} \right)$$

where $f_{mix}$ is the mixer frequency used in said quadrature demodulating steps and SR is said predetermined sample rate.

7. A system for estimating the velocity of flow containing a cloud of ultrasound scatterers, comprising:
    means for firing first and second ultrasound beams at first and second instants of time respectively, said first and second ultrasound beams being directed along a path of propagation through said flow, the period of time between said first and second instants of time constituting an interfiring period;
    means for detecting the ultrasound reflected by said scatterers to form first through n-th echo signals of said first firing and first through n-th echo signals of said second firing, said first through n-th echo signals being respectively the result of scattering in first through n-th range cells at first through n-th ranges along said path of propagation, where n is a positive integer greater than unity;
    means for quadrature demodulating said first through n-th echo signals of said first and second firings to form first and second sets of baseband data respectively;
    means for sampling said first and second sets of baseband data at a predetermined sample rate to form first and second sets of sampled baseband data respectively;
    means for selecting sampled baseband data from said first set which corresponds to a first group of adjacent range cells and from said second set which corresponds to a second group of adjacent range cells, said second group being displaced relative to said first group by a lag selected from a predetermined series of lags;
    means for pre-rotating said sampled baseband data selected from said second set to be in phase in the complex plane with said sampled baseband data selected from said first set;
    means for computing the complex correlation function correlating said sampled baseband data selected from said first set with said sampled baseband data selected from said second set for each lag in said predetermined series of lags;

means for determining which one of said predetermined series of lags corresponds to the maximum correlation between the real parts of said complex correlation function with minimum absolute phase; and means for computing an estimated flow velocity as a function of said determined lag value and said interfiring period.

8. The system as defined in claim 7, wherein said baseband data selected from said second set is rotated by a phase angle proportional to the lag.

9. The system as defined in claim 7, wherein said baseband data selected from said second set is rotated by a phase angle which is a function of the lag.

10. The system as defined in claim 9, wherein said baseband data selected from said second set is rotated by a phase angle equivalent to $(2\pi f_{mix}-\text{lag})/SR$, where lag is the lag value and $f_{mix}$ is the mixer frequency used in said quadrature demodulating steps and SR is said predetermined sample rate.

11. The system as defined in claim 7, wherein said complex correlation function is:

$$C(i, \text{lag}) = \sum_t S_i(t_0 + t) S'^*_{i+1}(t_0 + t + \text{lag})$$

where lag is the lag value and $S_i$ represents said pre-rotated baseband data of said first firing and $S'_i$ represents said pre-rotated baseband data selected from said second set.

12. The system as defined in claim 11, wherein:

$$S'_i(t + \text{lag}) = (I_i(t + \text{lag}) + iQ_i(t + \text{lag})) \left( \cos \frac{2\pi f_{mix}\text{lag}}{SR} - i\sin \frac{2\pi f_{mix}\text{lag}}{SR} \right)$$

where $f_{mix}$ is the mixer frequency used in said quadrature demodulating steps and SR is said predetermined sample rate.

13. In an ultrasound imaging system for imaging flow containing a cloud of ultrasound scatterers, comprising means for using time-domain cross-correlation to determine the respective complex correlation functions for correlation of a first set of baseband data corresponding to a group of range-gated sections produced by a first firing along an axis at a first instant in time to each of a plurality of second sets of baseband data respectively corresponding to a plurality of shifted groups of range-gated sections produced by a second firing along said axis at a second instant of time, said first and second instants of time defining an interfiring period, and said shifted groups of range-gated sections being shifted by a lag selected from a predetermined series of lags, the improvement wherein means are provided for pre-rotating the baseband data of each of said second sets to be in phase in the complex plane with the baseband data of said first set prior to said time-domain cross-correlation.

14. The ultrasound imaging system as defined in claim 13, further comprising:

means for determining which one of said predetermined series of lags corresponds to the maximum correlation between the real parts of said complex correlation function with minimum absolute phase; and means for computing an estimated flow velocity as a function of said determined lag value and said interfiring period.

15. The ultrasound imaging system as defined in claim 14, further comprising:

means for displaying an image made up of pixels having a property which varies as a function of said estimated flow velocity.

16. The ultrasound imaging system as defined in claim 13, wherein said second set of baseband data is rotated by a phase angle proportional to the lag.

17. The ultrasound imaging system as defined in claim 13, wherein said second set of baseband data is rotated by a phase angle which is a function of the lag.

18. The ultrasound imaging system as defined in claim 17, wherein said second set of baseband data is rotated by a phase angle equivalent to $(2\pi f_{mix} \times \text{lag})/SR$, where lag is the lag value and $f_{mix}$ is the mixer frequency used in said quadrature demodulating steps and SR is said predetermined sample rate.

19. The ultrasound imaging system as defined in claim 13, wherein said complex correlation function is:

$$C(i, \text{lag}) = \sum_t S_i(t_0 + t) S'^*_{i+1}(t_0 + t + \text{lag})$$

where lag is the lag value and $S_i$ represents said pre-rotated baseband data of said first firing and $S'_i$ represents pre-rotated baseband data from said second set.

20. The ultrasound imaging system as defined in claim 19, wherein:

$$S'_i(t + \text{lag}) = (I_i(t + \text{lag}) + iQ_i(t + \text{lag})) \left( \cos \frac{2\pi f_{mix}\text{lag}}{SR} - i\sin \frac{2\pi f_{mix}\text{lag}}{SR} \right)$$

where $f_{mix}$ is the mixer frequency used in said quadrature demodulating steps and SR is said predetermined sample rate.

* * * * *